United States Patent [19]

Riessen

[11] 4,027,768
[45] June 7, 1977

[54] LOW LEVEL AUGER SPOUT

[76] Inventor: Richard R. Riessen, R.R. No. 1, Walcott, Iowa 52773

[22] Filed: Jan. 12, 1976

[21] Appl. No.: 648,427

[52] U.S. Cl. .............................. 198/370; 198/671
[51] Int. Cl.² ................... B65G 33/14; B65G 47/46
[58] Field of Search .............. 198/64, 66, 68, 213, 198/169, 657, 538, 671, 370; 193/2 A, 3, 23, 29, 31 A, 33, 34; 214/17 R, 17 D, 17 DA, 17 DC; 302/59; 251/345, 352

[56] References Cited

UNITED STATES PATENTS

| | | | |
|---|---|---|---|
| 564,765 | 7/1896 | Rumely | 198/169 |
| 833,141 | 10/1906 | van Nouhuys | 198/169 X |
| 1,071,535 | 8/1913 | Townshend | 193/34 X |
| 3,031,064 | 4/1962 | Kline | 198/66 |
| 3,034,667 | 5/1962 | Kline et al. | 198/206 X |
| 3,074,534 | 1/1963 | Thiele | 198/66 |
| 3,563,399 | 2/1971 | Shivers | 214/17 DA X |

FOREIGN PATENTS OR APPLICATIONS

| | | | |
|---|---|---|---|
| 234,035 | 6/1964 | Austria | 198/213 |
| 465,906 | 6/1950 | Canada | 198/66 |
| 732,612 | 9/1932 | France | 251/345 |
| 743,394 | 1/1956 | United Kingdom | 198/66 |

Primary Examiner—Evon C. Blunk
Assistant Examiner—James L. Rowland
Attorney, Agent, or Firm—Henderson, Strom & Sturm

[57] ABSTRACT

A sleeve having front and rear halves. The front sleeve half has an aperture formed therethrough and a spout affixed thereto over the aperture. An auger brace is attached between the wall of a grain bin and a vertical truck conveyor. An aperture is formed through the side of the vertical conveyor adjacent to and above the point of attachment of the auger brace to the vertical conveyor. The sleeve halves are detachably joined together around the vertical conveyor, the joined sleeve halves forming the sleeve which is rotatable about the vertical conveyor and slidable along the length of the conveyor. The sleeve is rotatable upon the auger brace. The sleeve is rotated such that the aperture in the conveyor and the aperture in the front sleeve half are rotated into and out of alignment thereby allowing grain to empty from the grain bin through the spout of the sleeve at a low level or through the down spout at the upper end of the conveyor.

6 Claims, 4 Drawing Figures

LOW LEVEL AUGER SPOUT

BACKGROUND OF THE INVENTION

This invention relates to apparatus which are used for removing grain from storage or drying bins. More particularly, this invention relates to vertical truck conveyors. These conveyors commonly are attached to the side of a grain bin, the base member and drive motor of the conveyor connecting with the underfloor auger to affix the bottom end of the vertical conveyor to the bin and the conveyor brace extending between the bin and the vertical auger to affix the top end of the vertical conveyor to the bin. The vertical truck conveyors are normally 14 to 16 feet (427 to 487 cm) in height. A down spout is located at the upper end of the vertical conveyor, and grain is discharged therefrom after having traveled outwardly through the underfloor auger and upwardly through the length of the vertical conveyor. The vertical conveyor has sufficient height such that wagons or trucks may be loaded with grain.

Problems arise when the particular operation being performed requires handling of grain at a level close to the ground. Grinding grain or transferring grain to another conveyor for storage in another bin are examples of such operations. The large grain drop from the down spout of the vertical truck conveyor to the ground makes the performance of these operations very difficult.

In particular, when grain is to be ground, a grinder-mixer apparatus is used. The grinder-mixer employs a hammermill to grind the grain. The ground-up grain is then passed into the mixer portion of the apparatus. The grain enters the hammermill through an aperture normally 18 inches (46 cm) square. The height of the down spout of the vertical conveyor makes it necessary to confine the grain until it enters the grinder-mixer apparatus, which apparatus is normally about 4 feet (122 cm) in height. Several methods of confining the grain are presently available: attaching a flexible metal tubing or plastic drain tile between the down spout and the hammermill, attaching a solid metal tube over the down spout and maneuvering the grinder-mixer such that the aperture thereof is aligned under the end of the tube, unloading the grain into a wagon and grinding the grain out of the wagon, and loading the wagon and transporting the grain to a different facility. The first of the foregoing methods is inadequate since the tubing must be wrestled with while used and, additionally, must be removed if other operations are to be performed such as loading a wagon or truck. The second of the foregoing methods is inadequate because a long pipe, normally 8 to 10 feet (244 to 305 cm) in length must be wrestled with, and additional support structures must be used to keep the pipe out of the hammermill. The last two of the foregoing methods are inadequate because additional equipment must be used and additional grain transfers are required.

SUMMARY OF THE INVENTION

An attachment for a vertical truck conveyor is provided which includes a sleeve member. The sleeve member is formed by detachably connected front and rear sleeve halves. An aperture is formed in the front sleeve half, and a spout is attached to the front sleeve half over the aperture. An auger brace extends between the grain bin and the vertical conveyor and is attached to the conveyor intermediate the down spout and the base of the vertical conveyor. An aperture is formed through the side of the vertical conveyor adjacent to and above the point of attachment of the auger brace. The sleeve halves are attached over the vertical conveyor, and the sleeve is rotatable about and slidable along the length of the vertical conveyor.

The sleeve is moved along the length of the vertical conveyor to a resting position upon the auger brace and over the aperture formed in the side of the vertical conveyor. The sleeve is then rotated to move the apertures into or out of alignment thereby selectively allowing the grain to flow out of the spout of the sleeve or out of the down spout of the vertical conveyor. A clamping mechanism locks the sleeve against rotation from the proper position.

It is an object of this invention to provide a low level auger spout which is sturdy in construction, has few parts and is economical of manufacture.

Another object of this invention is to provide a highly portable low level auger spout which can adapt standard vertical truck conveyors to the efficient performance of low level grain handling operations such as grinding or transferring grain to another conveyor for storage in a different bin.

Still another object of this invention is to provide a low level conveyor spout which adapts a standard vertical truck conveyor to the efficient performance of low level grain handling operations while permitting the retention of the advantages of the vertical conveyor for operations such as the loading of trucks or wagons.

These objects and other features and advantages of the low level auger spout of this invention will become readily apparent upon referring to the following description, when taken in conjunction with the appended drawings.

BRIEF DESCRIPTION OF THE DRAWING

The low level auger spout of this invention is illustrated in the drawing wherein.

DESCRIPTION OF THE PREFERRED EMBODIMENT

Figure 1:
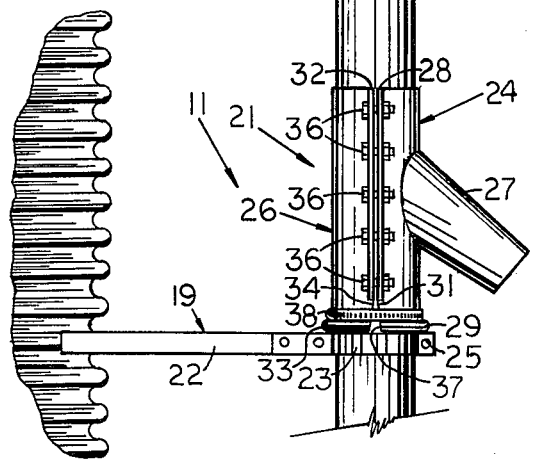
FIG. 1 is a fragmentary, foreshortened side elevational view of an alternate embodiment of the invention in attachment with a vertical truck conveyor affixed to a grain bin.

Referring now to the drawings, the low level auger spout of this invention is indicated generally at 11 in FIG. 1 in attachment with a vertical truck conveyor 12. The conveyor 12 includes a vertically disposed portion 13. A down spout 14 is formed of the upper end of the portion 13. An auger brace 16 connects the upper end of the portion 13 to the wall of a grain bin 17, the down spout 14 being directed away from the bin 17. The lower end (not shown) of the portion 13 is connected to a base support member (not shown). The low level auger spout 11 more particularly includes an aperture 18, a second auger brace 19 and a sleeve member 21.

Figure 2:
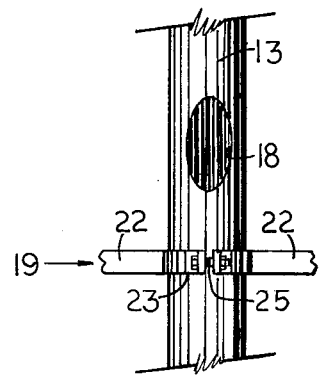
FIG. 2 is a fragmentary end elevational view of the vertical truck conveyor showing the second aperture and conveyor brace of the low level auger spout.

Referring to FIG. 2, the aperture 18 is formed in the tubing of the portion 13. The aperture 18 is substantially oval in shape and is located approximately 6 to 8 feet (183 to 244 cm) above the ground, or approximately intermediate the down spout 14 and base support (not shown) of an conveyor 12 of standard 14 to 16 feet (427 to 487 cm) height. The aperture 18 is located in the conveyor 13 facing directly away from the wall of the bin 17.

The second auger brace 19 (FIGS. 1 and 2) is horizontally disposed and extends between the wall of the bin 17 and the portion 13. The brace 19 includes shaft portions 22 each of which is affixed at one end thereof to the wall of the bin 17 and is attached at the other end thereof to a bracket member 23. The shaft portions 22 angle away from each other as they extend from the bracket 23 toward the wall of the bin 17, the portions 22 and bin 17 thereby enclosing a triangular-shaped space when viewed in plan. The bracket 23 fits around the portion 13 and is attached thereto, as with a bolt 25, proximate to and below the aperture 18.

Figure 3:
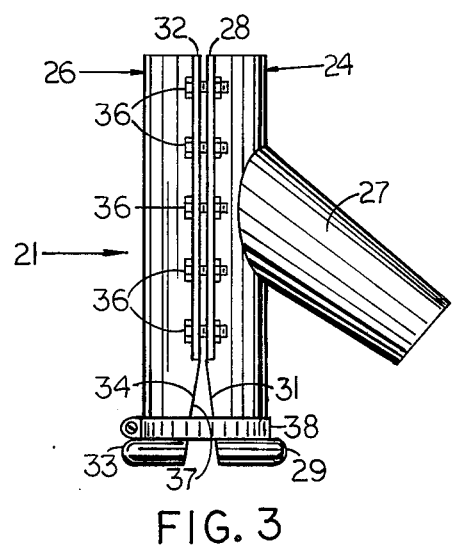
FIG. 3 is an enlarged, side elevational view of the sleeve member and spout of the alternate embodiment.

The sleeve member 21 of the alternate embodiment (FIGS. 1 and 3) includes front and rear sleeve halves 24, 26. The front sleeve half 24 intermediate its ends has an aperture (not shown) formed therethrough. The aperture (not shown) is oval in shape, and a spout 27 is affixed to the front sleeve half 24 over the aperture (not shown). The spout 27 extends from the sleeve half 24 at an angle. The sleeve half 24 is semi-circular in cross-section and is elongated. Side flanges 28 extend outwardly from the longitudinal edges of the sleeve half 24 and are normal to the surface of the sleeve half 24. At one end of the sleeve half 24, the edge thereof forms a curved flange 29. Along one longitudinal edge thereof, the side flange 28 terminates adjacent the curved flange 29, and the longitudinal edge forms a beveled portion 31 which extends from the side flange 28 to the curved flange 29. The spout 27 is angled toward the end of the sleeve half 24 bearing the curved flange 29.

The rear sleeve half 26 of the alternate embodiment is elongated and is semi-circular in cross-section. Side flanges 32 extend outwardly from the longitudinal edges of the sleeve half 26 and are normal to the surface of the sleeve half 26. The edge at one end of the sleeve half 26 forms a curved flange 33. The side flange 32 of one longitudinal edge terminates proximate to the curved flange 33, the longitudinal edge forming a beveled portion 34 which extends between the side flange 32 and the curved flange 33.

The sleeve halves 24, 26 are joined together by bolts 36. The side flanges 28 are pressed against the side flanges 32, and the bolts 36 then are passed through the flanges 28, 32. The sleeve halves 24, 26 are oriented such that the beveled portions 31, 34 are disposed on the same side and, together with the curved flanges 29, 33, at the same end of the assembled sleeve member 21. A notch 37 is formed in one end of the sleeve member 21 by the beveled portions 31, 34. A clamping member 38 fits around the sleeve member 21 over the notch 37 and adjacent to the curved flanges 29, 33.

Figure 4:
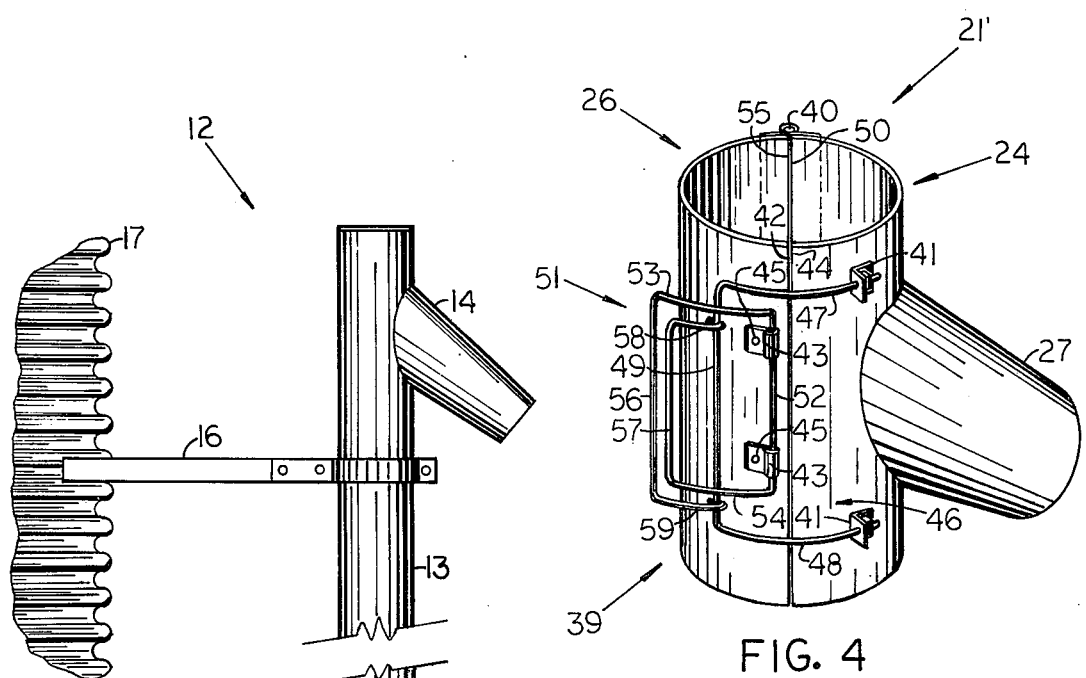
FIG. 4 is an enlarged, side elevational view of the sleeve member and spout of the preferred embodiment of the low level auger spout.

The sleeve member 21' of the preferred embodiment is shown in FIG. 4. A piano hinge 40 and a clamping mechanism 39 replace the side flanges 28, 32 and bolts 36 of the alternate embodiment of the sleeve member 21. The piano hinge 40 pivotally connects the sleeve halves 24, 26 along first longitudinal edges 50, 55 thereof. The sleeve member 21' may or may not have curved flanges 29, 33 and is depicted in FIG. 4 without the flanges 29, 33.

The clamping mechanism 39 includes two tabs 41 which project from the sleeve half 24. The tabs 41 are aligned in the same plane and are parallel to the second longitudinal edge 42 of the sleeve half 24. The tabs 41 are normal to the surface of the sleeve half 24 and disposed thereon between the longitudinal edge 42 and the spout 27. The clamp 39 also includes two loops 43 which are affixed to the rear sleeve half 26 close to the second longitudinal edge 44. The loops 43 are parallel and extend from the points of attachment 45 to the sleeve half 26 toward the edge 44. The loops 43 are perpendicular to the longitudinal edge 44.

The clamp 39 includes a continuously formed U-shaped member 46. The member 46 includes parallel first and second arcuate portions 47, 48 which are pivotally attached to the tabs 41. A transverse portion 49 interconnects the arcuate portions 47, 48. The member 46 extends from the tabs 41 toward the longitudinal edge 42.

The clamp 39 also includes a continuously formed square-shaped member 51. The member 51 includes a straight portion 52 which is slidably rotatably received within the loops 43. Parallel first and second arcuate portions 53, 54 extend from opposite ends of the straight portion 52. Parallel straight portions 56, 57 extend perpendicularly from the arcuate portions 53, 54 and terminate in hooks 58, 59. The hooks 58, 59 are normal to the straight portions 56, 57, the hook 58 being parallel to and adjacent the first arcuate portion 53 and the hook 59 being parallel to and adjacent the second arcuate portion 54. The hooks 58, 59 extend toward the straight portions 52.

When the low level auger spout 11 is to be used with a standard vertical truck conveyor 12, the aperture 18 is formed in the conveyor 12. The conveyor brace 19 is affixed between the wall of the bin 17 and the conveyor 12. The front and rear sleeve halves 24, 26 are placed against the conveyor 12 with the spout 27 disposed toward the ground, and bolts 36, in the alternate form of the sleeve 21, are passed through the abutting side flanges 28, 32. The low level auger spout is then slid along the length of the conveyor 12 into position over the aperture 18, the curved flanges 29, 33 resting upon the brace 19.

If it is desired that the grain within the grain bin 17 be emptied therefrom into a truck or wagon (not shown) for transport, the sleeve 21 is rotated about the conveyor 12, such that the aperture (not shown) formed in the front sleeve half 24 is completely out of alignment with the aperture 18. The sleeve is then clamped against further rotation by tightening of the clamp 38. Upon actuation of the conveyor 12, the grain flows upwardly through the vertical portion 13 to the down spout 14 and therethrough into the truck or wagon.

If instead it is desired that the grain be loaded into a grinder-mixer apparatus (not shown), the clamp 38 is loosened, and the sleeve 21 rotated to align the aperture (not shown) of the front sleeve half 24 with the aperture 18. The clamp 38 is again tightened. Thereupon, grain flowing up the vertical portion 13 passes through the aligned apertures and through the spout 27 into the grinder-mixer apparatus (not shown).

When the sleeve 21' of the preferred embodiment of the low level auger spout 11 is employed, the sleeve halves 24, 26 are pivoted about the piano hinge 40 such that the second longitudinal edges 42, 44 are moved apart. The sleeve 21' is then fitted over the conveyor 12, and the sleeve halves 24, 26 are pivoted about the piano hinge 40 such that the longitudinal edges 42, 44 are moved together. The sleeve halves 24, 26 are pivoted together until the sleeve 21' is fitted to the conveyor 12, the front sleeve half 24 being slidable over the rear sleeve half 26 to fit the sleeve 21' to conveyors 12 having different cross-sectional diameters. The second longitudinal edge 42 is slidable past the second longitudinal edge 44, over the rear sleeve half 26 and under the loops 43 as far as the points of attachment 45 of the loops 43. The loops 43 thereby aid in securing the sleeve 21' to the conveyor 12 when the sleeve halves 24, 26 are overlapped. When the sleeve 21' includes the lower curved flanges 29, 33, the flanges 29, 33 are so formed that the flange 29 slides within the flange 33 when the front sleeve half 24 overlaps the rear sleeve half 26.

When the sleeve halves 24, 26 are pivoted together, the rear sleeve half 26 is also slidable over the front sleeve half 24. The second longitudinal edge 44 is slidable past the second longitudinal edge 42, over the front sleeve half 24 to the tabs 41. The sleeve 21' is adapted thereby to vertical conveyor 12 of still smaller diameters.

Again, where the sleeve 21' includes the curved flanges 29, 33, the flanges 29, 33 are so formed that the flange 33 slides within the flange 29 when the rear sleeve half 26 overlaps the front sleeve half 24. The flanges 29, 33 can be crimped or widened easily such that the sleeve 21' is adjustable to permit either sleeve half 24 or 26 to overlap the other.

Again, the sleeve 21' is moved along the length of the vertical conveyor 12 into position over the aperture 18. The sleeve 21' is rotated such that the aperture (not shown) formed in the front sleeve half 24 is brought into or out of alignment with the aperture 18, and the clamping mechanism 39 is actuated to secure the sleeve 21' in the proper alignment. Grain is made to flow out of the spout 27 or down spout 14 thereby.

When the clamping mechanism 39 is actuated to secure the sleeve 21' to the conveyor 12 and against rotation thereon, the hooked portions 58, 59 of the square member 51 first detachably receive the straight portion 49 of the U-shaped member 46. The straight portions 56, 57 are grasped then by the operator, and the member 51 is pivoted downwardly toward the surface of the rear sleeve half 26 and away fom the second longitudinal edges 42, 44. The U-shaped member 46 is pivoted about the tabs 41 and is drawn by the member 51 away from the surface of the front sleeve member 24, over the edges 42, 44 and downwardly toward the rear sleeve half 26. The arcuate portions 47, 48, 53, 54 are pressed against the rear sleeve half 26.

When the clamping mechanism 39 is actuated to permit rotation of the sleeve 21' about the conveyor 12, the straight portions 56, 57 are grasped, and the member 51 is pivoted upwardly from the rear sleeve half 26 toward the front sleeve half 24. The U-shaped member is pivoted away from the rear sleeve half 26, and the sleeve halves 24, 26 are spread apart by pivoting about the piano hinge 40. The straight portion 49 is disengaged from the hooks 58, 59 if the sleeve 21' is to be removed from the conveyor 12. The straight portion 49 is re-engaged by the hooks 58, 59. The straight portions 56, 57 are grasped, and the clamping mechanism 39 is used as a carrying handle for transporting the sleeve 21'.

It can be seen that the low level auger spout 11 is a sturdy structure which has few parts and is therefore economical to manufacture. The invention 11 is highly portable and can be attached to conveyors 12 of different sizes. Due to the small grain drop involved, the spout 11 permits low level grain handling, such as grinding of the grain or transferring grain to another conveyor for storage in another bin, in a highly efficient manner. At the same time the regular down spout 14 of the conveyor 12 remains available should the need arise to load grain into a wagon or truck. Thus it can be seen that the objects of this invention have been attained.

Although a preferred embodiment and an alternate embodiment thereof have been disclosed herein, it is to be remembered that various modifications and alternate constructions can be made thereto without departing from the full scope of the invention, as defined in the appended claims.

I claim:

1. An auger spout for use with vertical truck conveyors, the vertical truck conveyor being attached to a grain bin, the vertical truck conveyor having at the upper end thereof a down spout, the grain flowing out of the grain bin passing upwardly through the vertical truck conveyor and out through the down spout, said auger spout comprising:

a sleeve member, said sleeve member being detachably affixed to the vertical truck conveyor, said sleeve member being slidable along the length of and rotatable about the vertical truck conveyor, said sleeve member having a first aperture formed through the side thereof;

a spout affixed to said sleeve member, said spout being affixed over said first aperture, said spout extending downwardly and angularly from said sleeve member, said sleeve member including elongated front and rear sleeve halves, said first aperture being formed through said front sleeve half, said spout being affixed to said front sleeve half over said first aperture, said sleeve halves being detachably joined along the longitudinal edges thereof, said spout being carried by said sleeve member; and the vertical truck conveyor having a second aperture formed through the side thereof, said sleeve member slidable to a position directly over said second aperture, said sleeve member selectively rotatable to align said first aperture, said second aperture and said spout, whereby the grain is made to flow out of the vertical truck conveyor through said spout, said sleeve member slidable to a position completely away from said second aperture, whereby access to and through said second aperture is facilitated.

2. An auger spout for use with vertical truck conveyors, the vertical truck conveyor being attached to a grain bin, the vertical truck conveyor having at the upper end thereof a down spout, the grain flowing out of the grain bin passing upwardly through the vertical truck conveyor and out through the down spout, said auger spout comprising:

a sleeve member, said sleeve member being detachably affixed to the vertical truck conveyor, said sleeve member being slidable along the length of and rotatable about the vertical truck conveyor, said sleeve member having a first aperture formed through the side thereof;

a spout affixed to said sleeve member, said spout being affixed over said first aperture, said spout extending downwardly and angularly from said sleeve member;

the vertical truck conveyor having a second aperture formed through the side thereof, said sleeve member slidable to a position directly over said second aperture, said sleeve member selectively rotatable to align said first aperture and said second aperture, whereby the grain is made to flow out of the vertical truck conveyor through said spout; and a clamp having a first member and a second member, said sleeve member including elongated front and rear sleeve halves, said first aperture being formed through said front sleeve half, said spout being affixed to said front sleeve half over said first aperture, said sleeve halves each having first and second longitudinal edges, said sleeve halves being detachably pivotally joined along said first longitudinal edges, said first member being pivotally affixed to said front sleeve half and said second member being pivotally affixed to said rear sleeve half adjacent said second longitudinal edges, said first member extending from said front sleeve half to detachably hook said second member extended from said rear sleeve half, said first member being pivotable over said second longitudinal edges toward said rear sleeve half to pivot said second member over said second longitudinal edges toward said front sleeve half, pivoting of said first and second members causing said second longitudinal edges to abut.

3. An auger spout as defined in claim 2 and further wherein said second longitudinal edges move past each other upon pivoting of said first and second members, said front and rear sleeve halves thereby overlapping.

4. An auger spout as defined in claim 3 and further wherein said sleeve halves have formed at one end thereof curved flanges, said curved flanges telescoping when said sleeve halves overlap.

5. An auger spout for use with vertical truck conveyors, the vertical truck conveyor being attached to a grain bin, the vertical truck conveyor having at the upper end thereof a down spout, the grain flowing out of the grain bin passing upwardly through the vertical truck conveyor and out through the down spout, said auger spout comprising:

a sleeve member, said sleeve member being detachably affixed to the vertical truck conveyor, said sleeve member being slidable along the length of and rotatable about the vertical truck conveyor, said sleeve member having a first aperture formed through the side thereof;

a spout affixed to said sleeve member, said spout being affixed over said first aperture, said spout extending downwardly and angularly from said sleeve member;

the vertical truck conveyor having a second aperture formed through the side thereof, said sleeve member slidable to a position directly over said second aperture, said sleeve member selectively rotatable to align said first aperture and said second aperture, whereby the grain is made to flow out of the vertical truck conveyor through said spout;

a clamp being detachably affixed around said sleeve member, said clamp being tightened to hold said sleeve member at a particular position upon the vertical truck conveyor, said clamp being loosened to permit said sleeve member to rotate about or move along the length of the vertical truck conveyor; and a plurality of wedge-shaped notches being formed in said sleeve member at one end thereof, said clamp fitting around said sleeve member over said notches.

6. An auger spout for use with vertical truck conveyors, the vertical truck conveyor being attached to a grain bin, the vertical truck conveyor having at the upper end thereof a down spout, the grain flowing out of the grain bin passing upwardly through the vertical truck conveyor and out through the down spout, said auger spout comprising:

a sleeve member, said sleeve member being detachably affixed to the vertical truck conveyor, said sleeve member being slidable along the length of and rotatable about the vertical truck conveyor, said sleeve member having a first aperture formed through the side thereof;

a spout affixed to said sleeve member, said spout being affixed over said first aperture, said spout extending downwardly and angularly from said sleeve member;

the vertical truck conveyor having a second aperture formed through the side thereof, said sleeve member slidable to a position directly over said second aperture, said sleeve member selectively rotatable to align said first aperture and said second aperture, whereby the grain is made to flow out of the vertical truck conveyor through said spout;

a brace interconnecting the grain bin and the vertical truck conveyor, said brace being connected to the vertical truck conveyor to rest upon said brace, said brace supporting said sleeve member at said position directly over said second aperture; and said sleeve member has formed at one end thereof curved flanges, said flanges abutting said brace when said sleeve member is directly over said second aperture.

* * * * *